(12) United States Patent
Cavanagh

(10) Patent No.: US 7,503,247 B2
(45) Date of Patent: Mar. 17, 2009

(54) DUAL INLINE SLITTER

(75) Inventor: Kenneth M. Cavanagh, Warwick, RI (US)

(73) Assignee: Parkinson Technologies, Inc., Woonsocket, RI (US)

( * ) Notice: Subject to any disclaimer, the term of this patent is extended or adjusted under 35 U.S.C. 154(b) by 118 days.

(21) Appl. No.: 11/230,174

(22) Filed: Sep. 19, 2005

(65) Prior Publication Data

US 2007/0062356 A1    Mar. 22, 2007

(51) Int. Cl.
    *B26D 5/04*      (2006.01)
(52) U.S. Cl. .................. 83/563; 83/635; 83/639.1; 83/856; 83/941
(58) Field of Classification Search .......... 83/407, 83/563, 546, 544, 639.1, 856–858, 561, 455, 83/485, 940, 941, 635; 30/275, 444
    See application file for complete search history.

(56) References Cited

U.S. PATENT DOCUMENTS

| | | | | | |
|---|---|---|---|---|---|
| 4,094,217 | A | * | 6/1978 | Exline | 83/879 |
| 4,094,474 | A | * | 6/1978 | Stollenwerk et al. | 242/525.5 |
| 4,231,275 | A | * | 11/1980 | Onishi | 83/862 |
| 4,422,359 | A | * | 12/1983 | Leboeuf | 83/546 |
| 4,599,925 | A | * | 7/1986 | Rom | 83/56 |
| 4,667,553 | A | * | 5/1987 | Gerber et al. | 83/389 |
| 4,749,314 | A | * | 6/1988 | LeBlond | 408/68 |
| 4,823,665 | A | * | 4/1989 | Cavagna | 83/524 |
| 5,069,097 | A | * | 12/1991 | Mori | 83/56 |
| 5,370,026 | A | * | 12/1994 | Cavagna | 83/478 |
| 2002/0112586 | A1 | * | 8/2002 | Mori et al. | 83/563 |
| 2004/0016332 | A1 | * | 1/2004 | Price et al. | 83/455 |
| 2005/0132865 | A1 | * | 6/2005 | Wridge et al. | 83/881 |

* cited by examiner

*Primary Examiner*—Boyer D. Ashley
*Assistant Examiner*—Laura M. Lee
(74) *Attorney, Agent, or Firm*—Gauthier & Connors LLP

(57) ABSTRACT

An apparatus for slitting a web moving along a path comprises a mounting block adapted to be fixed at a location adjacent to the web path. A guard assembly includes a guard plate secured to rod members projecting from the mounting block. A blade guide is mounted on and shiftable along the rod members, and at least one blade is carried by the blade guide. An actuator serves to shift the blade guide along the rod members between an extended position at which the blade projects in a slitting position beyond the guard plate and into the web path, and a retracted position at which the blade is withdrawn from its slitting position and from the web path to a position where it is shielded from exposure by the guard plate.

15 Claims, 5 Drawing Sheets

DUAL INLINE SLITTER

BACKGROUND OF THE INVENTION

1. Field of the Invention

This invention relates to slitters for slitting moving webs and the like.

2. Description of the Prior Art

Conventional slitters employ either single or multiple alternately usable blades to slit moving webs. While such slitters operate in a generally satisfactory manner, they continue to suffer from a number of problems. For example, when the blades are withdrawn from the web path, they remain exposed and thus pose a safety hazard to operating personnel. Also, blade mountings are unduly complicated, making the task of replacing worn blades difficult and burdensome.

Among the objectives of the present invention is the provision of an improved slitting apparatus in which the blades are automatically shielded from exposure when they are withdrawn from the web path.

A companion objective of the present invention is the provision of an improved and simplified blade mounting and adjusting assembly.

SUMMARY OF THE INVENTION

A slitting apparatus in accordance with the present invention comprises a mounting block adapted to be fixed adjacent to a web path. A guard assembly includes a guard plate carried on rods projecting from the mounting block towards the web path. A blade guide is mounted on and shiftable along the rods. The blade guide carries at least one slitting blade. An actuator serves to shift the blade guide along the rods between an extended position at which the blade projects in a slitting position beyond the guard plate into the web path, and a retracted position at which the blade is withdrawn from the web path, and is shielded from exposure by the guard plate.

The slitting blade is detachably mounted on a carrier, which in turn is detachably mounted on and shiftable relative to the blade guide between an advanced setting at which the blade projects beyond a face of the blade guide, and a retracted setting at which the blade is withdrawn from the blade guide face. A magnet serves the dual function of releasably retaining the blade on the blade carrier, and releasably retaining the blade carrier in its retracted and advanced settings.

These and other features and advantages of the present invention will now be described in greater detail with reference to the accompanying drawings, wherein:

DETAILED DESCRIPTION OF THE INVENTION

Figure 1:
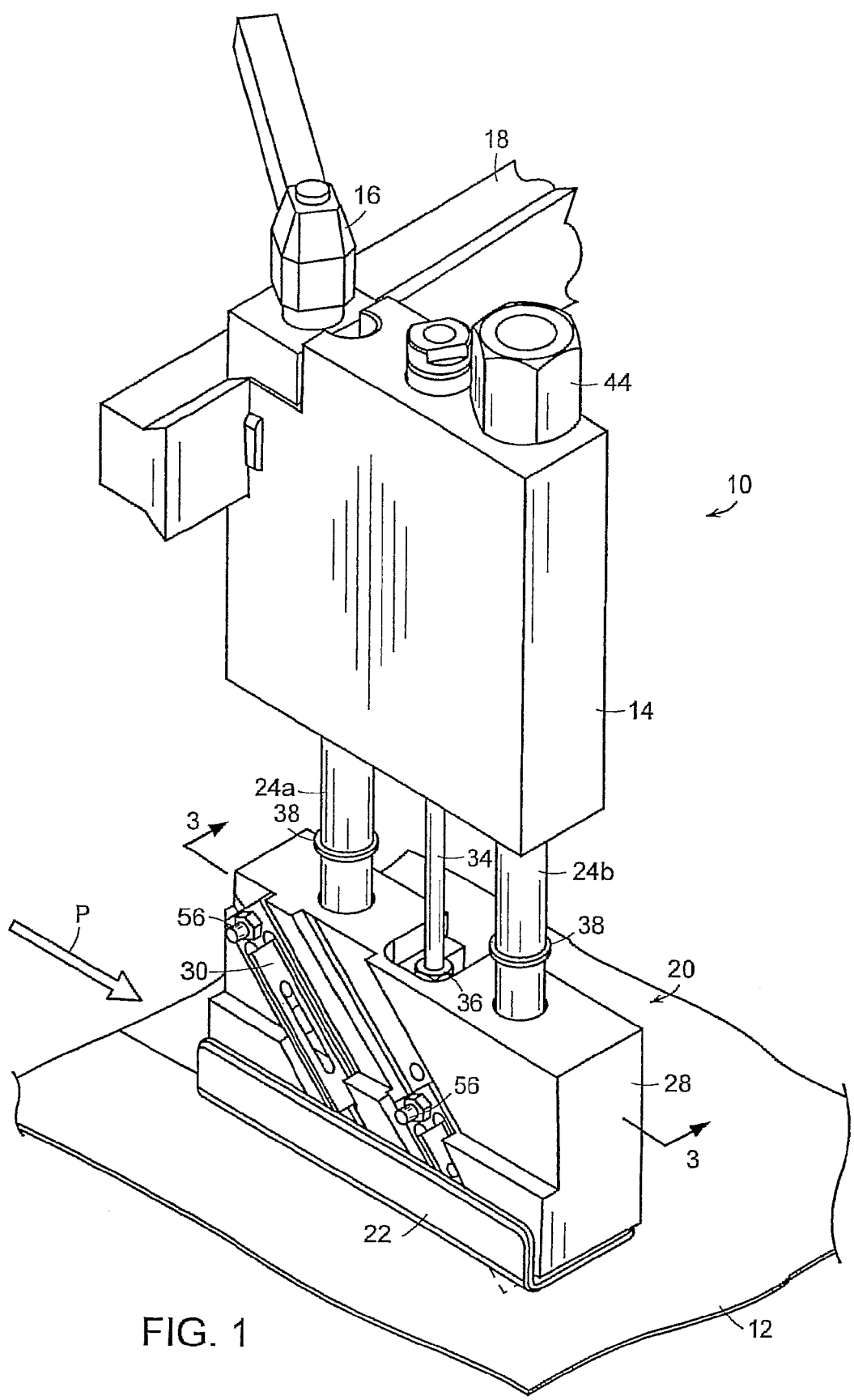
FIG. 1 is a perspective view of a slitter embodying the concepts of the present invention.

With reference initially to FIGS. 1-3C, a slitter 10 in accordance with the present invention is shown adjacent to a web 12 traveling along a path "P". The slitter includes a mounting block 14 adapted to be fixed by means of a clamp 16 to a support beam 18 overlying the web path P. A guard assembly 20 comprises a guard plate 22 secured to the distal ends of parallel rod members 24a, 24b The rod members project from the mounting block 14 towards the path P and are axially shiftable in bores in the mounting block.

Figure 2:
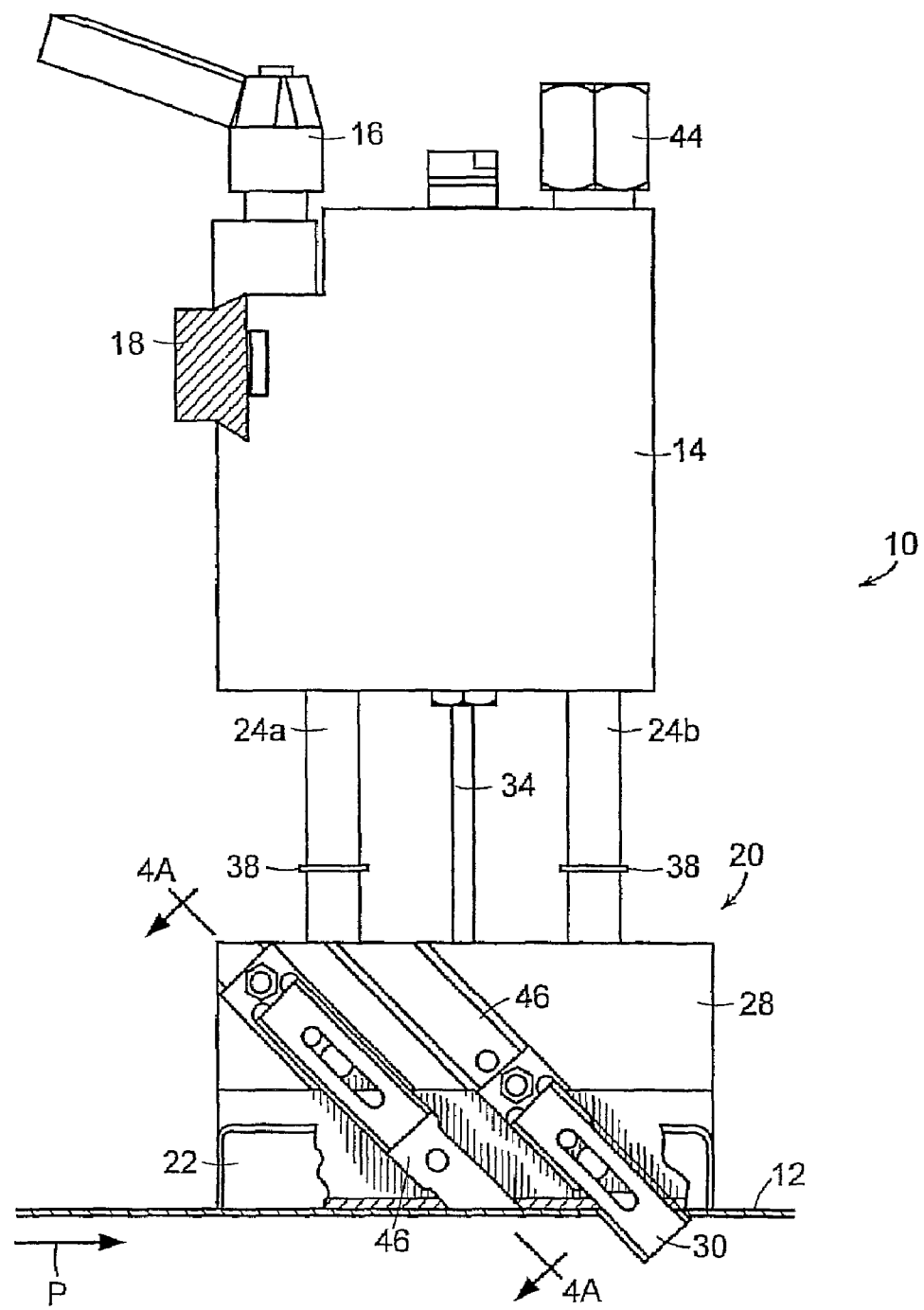
FIG. 2 is a side view of the slitter, with portions of the guard plate broken away.
Figure 3A:
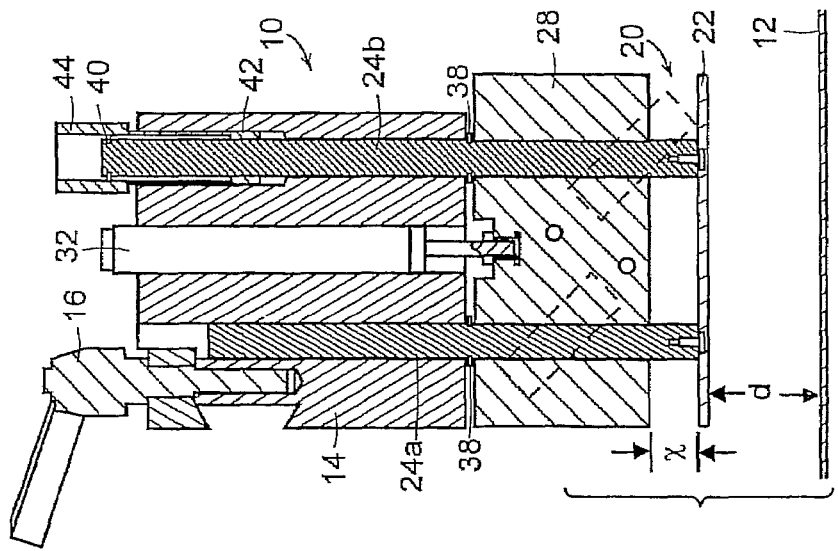
FIGS. 3A, 3B and 3C are vertical sectional views taken along line 3-3 of FIG. 1 and showing different operational stages of the slitter.

A blade guide 28 is mounted on and shiftable along the rod members 24a, 24b. At least one and preferably two or more blades 30 are carried by the blade guide 28. A pneumatic actuator 32 has a piston rod 34 connected as at 36 to the blade guide 28. The actuator 32 may be an air cylinder supplied by Bimba Manufacturing Company of Monee, Ill., USA, with an internal piston that is spring loaded into a retracted position and advanced by the controlled application of compressed air. The actuator 32 serves to shift the blade guide 28 and thus adjust the slitter between an operative slitting mode as shown in FIGS. 1, 2 and 3A, and a retracted and inoperative mode as shown in FIG. 3C.

At least one, and preferably both the mounting block 14 and the blade guide 28 are molded of a suitable plastic, e.g., nylon.

First locating elements in the form of external snap rings 38 are provided on the rod members 24a, 24b, and a second locating element 40 is provided on rod member 24b.

When the slitter 10 is in its operative slitting mode, the actuator 32 is operated to shift the blade guide 28 and the guard assembly 20 to a fully extended position, at which one of the blades 30 projects in a slitting position beyond the guard plate 22 and into the web path P. The second locating element 40 coacts with an internal stop shoulder 42 on a sleeve 44 threaded into the mounting block 14 to limit the extent of such extension. By screwing the sleeve 44 into and out of the mounting block, the position of the stop shoulder 42 and thus the extent of blade guide extension can be adjusted.

Figure 3B:
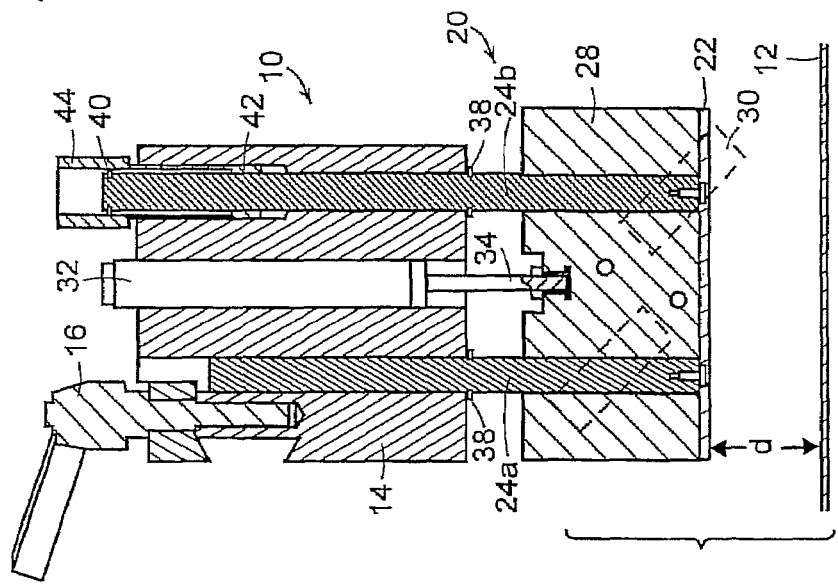
Figure 3C:
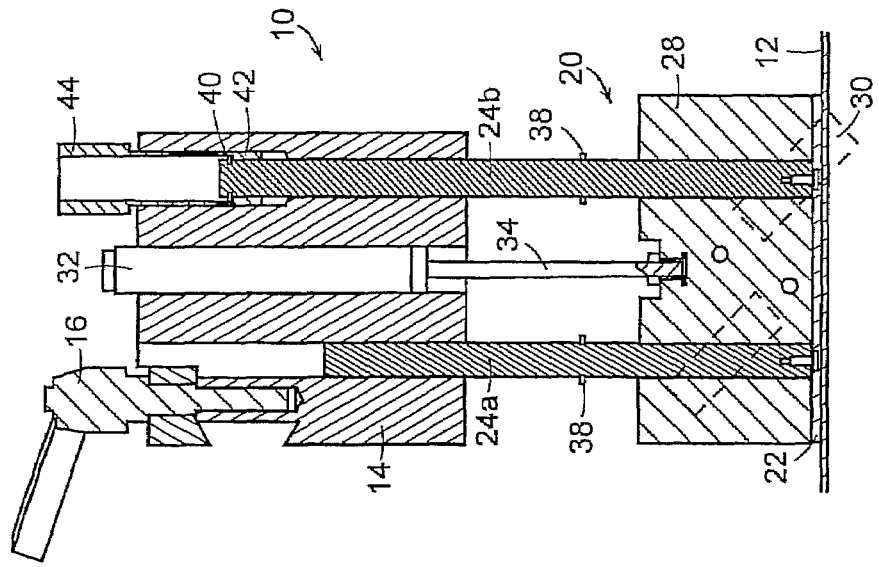

When adjusting the slitter from its operative slitting mode to its inoperative mode, the actuator 32 initially retracts the blade guide from its fully extended position as shown in FIG. 3A to an intermediate position as shown in FIG. 3B. Friction between the rods 24a, 24b and the blade guide 28 serves to retract the guard assembly 20 in unison with the blade guide 28 until the first locating elements 38 engage the underside of the mounting block 14. At this juncture, the blade guide and guard assembly have been removed from the web path by a distance "d", but the blade 30 remains exposed. However, as the actuator 32 continues to retract the blade guide 28, with the rod members 24a, 24b and guard plate 22 now held against further retraction by the engaged location elements 38, the blade guide is pulled away from the guard plate by a distance "x", thus retracting the blade to a position above the guard plate where it is shielded from exposure.

Although not shown, it will be understood that when the actuator 32 operates to adjust the slitter from its inoperative position (FIG. 3C) to its operative position (FIG. 3A), the blade guide 28 and guard assembly move downwardly in unison until the guard plate 22 has closed the distance "d", and the second locating element has contacted the stop shoulder 42. Continued downward movement of the blade guide then closes the distance "x" and exposes the blade 30 to the web path P.

Figures 4A, 4B:
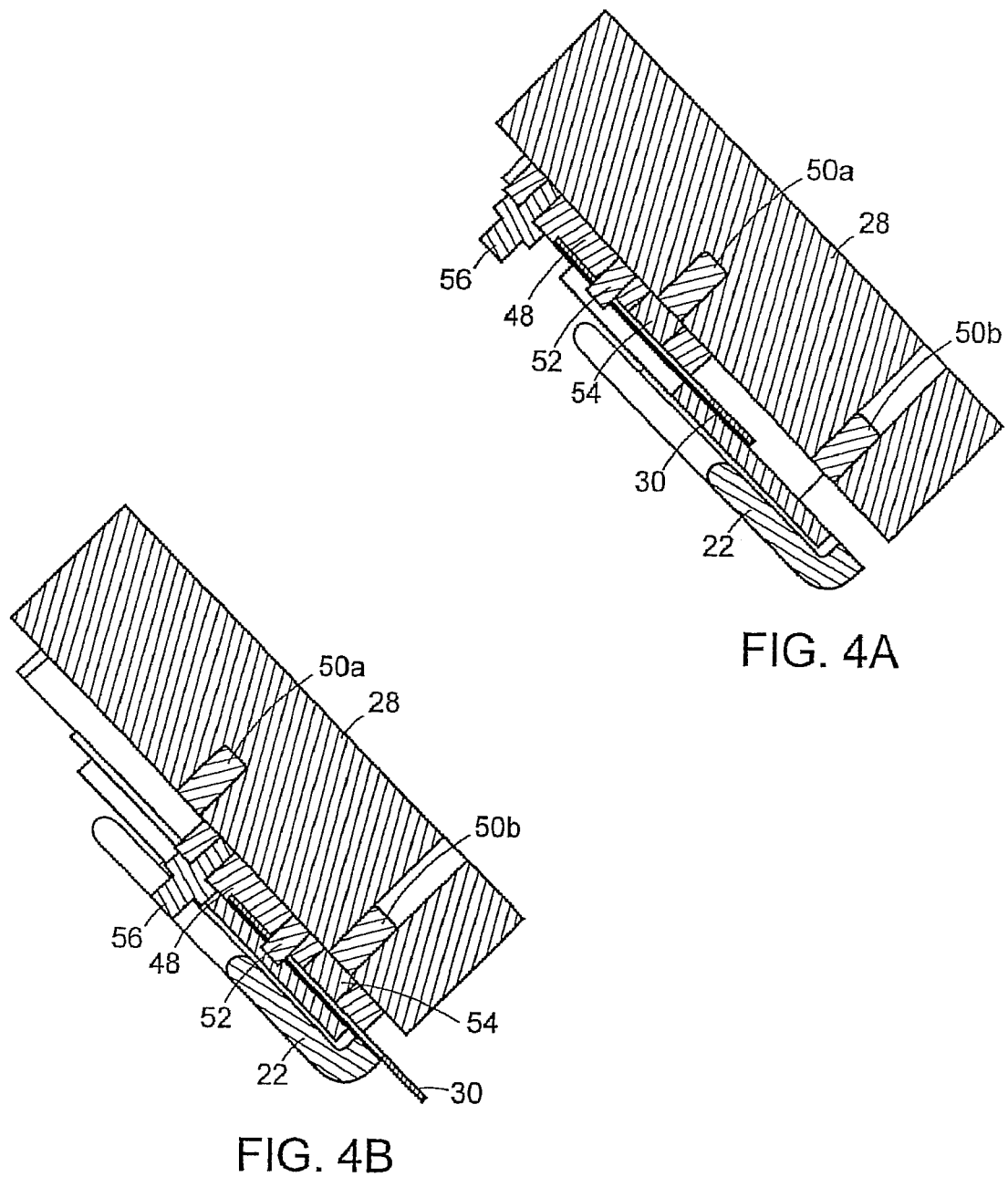
FIG. 4A is a sectional view taken along line 4-4 of FIG. 1 and showing the blade carrier in its retracted setting with the blade withdrawn from its slitting position.
FIG. 4B is a view similar to FIG. 4A showing the blade carrier in its advanced setting with the blade in its slitting position.
Figure 5:
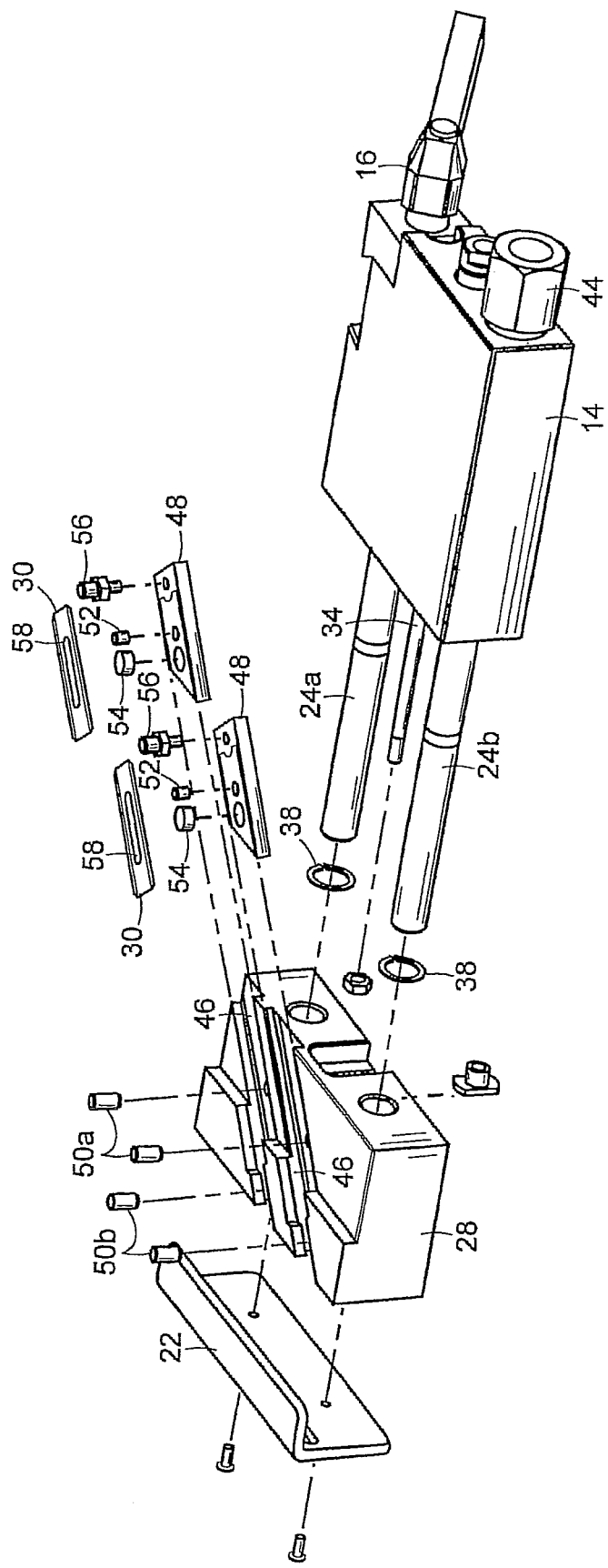
FIG. 5 is an exploded perspective view of selected components of the slitter.

The blade guide 28 is provided with at least one and preferably two angled channels 46 configured and dimensioned to slidably accept grooved blade carriers 48. Magnetic locators, e.g., steel dowels 50a, 50b are positioned at spaced locations along the channels 46. The blade carriers 48 are each provided with a locating pin 52, a magnet 54 and a finger 56. The blades 30 have centrally extending slots 58. The blades are placed on the blade carriers, with the locating pins 52 received in the blade slots 58, and when thus placed, are removably retained on the blade carriers by the magnets 54. The blade carriers are shiftable along the channels 46 and are releasably held in either a retracted setting (FIG. 4A) or an advanced setting (FIG. 4B) by the magnets 54 coacting respectively with the dowels 50a, 50b.

In light of the foregoing, the unique and advantageous features of the present invention will now be apparent to those skilled in the art. Of foremost importance is the ability to quickly and efficiently withdraw the slitting blades 30 from the web path P to positions shielded from exposure to operating personnel. The dual purpose magnets facilitate both blade replacement and adjustment of the blades between their operative slitting positions and their inoperative withdrawn positions.

I claim:

1. Apparatus for slitting a web moving along a path, said apparatus comprising:
    a mounting block adapted to be fixed at a location adjacent to said path;
    a guard assembly comprising a guard plate secured to rod members projecting from said mounting block;
    a blade guide mounted on and shiftable along said rod members;
    at least one blade carried by said blade guide; and
    actuating means for shifting said blade guide along said rod members between an extended position at which said blade projects in a slitting position beyond said guard plate and into said path, an intermediate position at which said blade remains extended beyond said guard plate yet is withdrawn from the path wherein both the blade guide and the guard plate move together with respect to the mounting block, and a retracted position at which said blade is withdrawn from said intermediate position and from said path and is shielded from exposure by said guard plate wherein the blade guide moves with respect to the guard plate.

2. The apparatus as claimed in claim 1 wherein said rod members are axially shiftable with respect to said mounting block, with first locating elements on said rod members, said actuating means being operative to retract said guard assembly and said blade guide, in unison, from said extended position to an intermediate position spaced from said path at which said blade remains in said slitting position projecting beyond said guard plate, with further retraction of said rod members being prevented by engagement of said first locating elements with said mounting block, and wherein said actuating means is additionally operative to further retract said blade guide with respect to said guard assembly and along said rod members to said retracted position.

3. The apparatus as claimed in claim 2 further comprising a second locating element on one of said rod members, and a stop carried by said mounting block, said second locating element being engageable with said stop to limit the extent to which said guard assembly may be extended by said actuating means.

4. The apparatus as claimed in claim 3 wherein said stop is adjustable to vary the extent to which said guard assembly may be extended.

5. The apparatus as claimed in claim 1 wherein said blade is detachably mounted on a carrier, and said carrier is detachably mounted on said blade guide, said blade guide being shiftable between an advanced setting at which said blade is in its slitting position, and a retracted setting at which said blade is withdrawn from its slitting position.

6. The apparatus as claimed in claim 5 wherein said carrier is provided with a magnet, and wherein said blade is detachably held on said carrier by said magnet.

7. The apparatus as claimed in claim 6 wherein said blade guide is provided with magnetic locators, and wherein said magnet further serves to releasably retain said carrier in said retracted and advanced settings.

8. The apparatus of claims 5, 6 or 7 wherein multiple carriers and their respective blades are detachably mounted on said blade guide, said carriers being selectively shiftable between said advanced and retracted settings.

9. The apparatus as claimed in claim 1 wherein at least one of said mounting block and blade guide comprises a molded plastic material.

10. Apparatus for slitting a web moving along a path, said apparatus comprising:
    a mounting block adapted to be fixed at a location adjacent to the path;
    a guard plate secured to rod members projecting from the mounting block;
    a blade guide mounted on and shiftable along the rod members;
    at least one blade carried by the blade guide; and
    actuating means for shifting the blade guide along the rod members between an extended stage in which the at least one blade projects in a slitting position beyond the guard plate and into the path,
        an intermediate stage in which both the blade guide and the guard plate move together with respect to the mounting block and in which the blade remains extended beyond the guard plate yet is withdrawn from the path, and
        a retracted stage in which the blade guide and the at least one blade move with respect to the guard plate and the mounting block, and in which the blade guide is withdrawn from the intermediate stage and from the path and is shielded from exposure by the guard plate.

11. The apparatus as claimed in claim 10, wherein the blade is detachably mounted on a carrier, and the carrier is detachably mounted on the blade guide.

12. The apparatus as claimed in claim 11, wherein the blade guide is movable between an advanced setting at which the blade is in its slitting position, and a retracted setting at which the blade is withdrawn from its slitting position.

13. The apparatus as claimed in claim 12 wherein the carrier is provided with a magnet, and wherein the blade is detachably held on the carrier by the magnet.

14. The apparatus as claimed in claim 13 wherein the blade guide is provided with magnetic locators, and wherein the magnet further serves to releasably retain the carrier in the retracted and advanced settings.

15. The apparatus of claims 12, 13 or 14 wherein multiple carriers and their respective blades are detachably mounted on the blade guide, the carriers being selectively movable between the advanced and retracted settings.

* * * * *